(12) United States Patent
Claessens et al.

(10) Patent No.: US 8,540,436 B2
(45) Date of Patent: Sep. 24, 2013

(54) OPTICAL FIBRE COUPLING DEVICE AND METHOD

(75) Inventors: Bart Mattie Claessens, Hasselt (BE); Sam Leeman, Kessel-Lo (BE); Robert Vanhentenrijk, Winksele (BE); Kristof Vastmans, Boutersem (BE)

(73) Assignee: Tyco Electronics Raychem BVBA, Kessel-lo (BE)

( * ) Notice: Subject to any disclaimer, the term of this patent is extended or adjusted under 35 U.S.C. 154(b) by 165 days.

(21) Appl. No.: 12/737,347

(22) PCT Filed: Jun. 25, 2009

(86) PCT No.: PCT/GB2009/050734
§ 371 (c)(1),
(2), (4) Date: Jan. 3, 2011

(87) PCT Pub. No.: WO2010/001148
PCT Pub. Date: Jan. 7, 2010

(65) Prior Publication Data
US 2011/0103750 A1      May 5, 2011

(30) Foreign Application Priority Data

Jul. 4, 2008  (GB) ................................. 0812260.8

(51) Int. Cl.
*G02B 6/36* (2006.01)
(52) U.S. Cl.
USPC ............................................ 385/89; 385/135
(58) Field of Classification Search
USPC .................................................... 385/135, 89
See application file for complete search history.

(56) References Cited

U.S. PATENT DOCUMENTS

| 5,323,478 A | * | 6/1994 | Milanowski et al. | ......... 385/135 |
| 5,363,466 A | * | 11/1994 | Milanowski et al. | ......... 385/135 |

(Continued)

FOREIGN PATENT DOCUMENTS

| EP | 5 717 810 A | 9/1999 |
| WO | WO 99/38042 A1 | 7/1999 |
| WO | WO 00/28363 A1 | 5/2000 |

OTHER PUBLICATIONS

International Preliminary Report on Patentability for International Application No. PCT/GB2009/050734, issued by the International Searching Authority (European Patent Office, Munich, Germany), and transmitted by the International Bureau of WIPO, Geneva, Switzerland, dated Jan. 13, 2011.
Search Report for International Application No. PCT/GB2009/050734 issued by the European Patent Office on Nov. 27, 2009.

*Primary Examiner* — Charlie Peng
*Assistant Examiner* — Peter Radkowski
(74) *Attorney, Agent, or Firm* — Faegre Baker Daniels LLP

(57) ABSTRACT

An optical fiber coupling device and a method are disclosed. The optical fiber coupling device includes a first patch strip having a first plurality of optical fiber connectors arranged along a face of the first patch strip and a second patch strip having a second plurality of optical fiber connectors arranged along a face of the second patch strip. The first and second patch strips are in a stacked arrangement where the second plurality of optical fiber connectors is offset from the first plurality of optical fiber connectors in a first and a second direction transverse to a stacking direction. The offsetting improves access to the individual optical fiber connectors which assists an operative when managing or maintaining optical fiber connections and helps to reduce the likelihood of fatigue or failure since adjacent optical fiber connections are undisturbed during this process and the optical fiber connections may be easily accessed without needing to move or manipulate adjacent patch strips.

15 Claims, 5 Drawing Sheets

(56) References Cited

U.S. PATENT DOCUMENTS

| | | | |
|---|---|---|---|
| 5,717,810 A | 2/1998 | Wheeler | |
| 6,253,016 B1 * | 6/2001 | Daoud | 385/135 |
| 2005/0233647 A1 * | 10/2005 | Denovich et al. | 439/719 |
| 2007/0077019 A1 * | 4/2007 | Barth et al. | 385/135 |
| 2008/0170831 A1 * | 7/2008 | Hendrickson et al. | 385/135 |
| 2009/0207577 A1 * | 8/2009 | Fransen et al. | 361/790 |

* cited by examiner

OPTICAL FIBRE COUPLING DEVICE AND METHOD

FIELD OF THE INVENTION

The present invention relates to an optical fibre coupling device and a method.

BACKGROUND OF THE INVENTION

In a multiple dwelling unit (such as a building) which receives outside service provider optical fibre cables from a provider, it is necessary to couple these outside service provider optical fibre cables with riser optical fibre cables feeding individual dwelling units (such as apartments) within the multiple dwelling unit. Traditionally, such optical fibre coupling may be achieved by splicing an optical fibre from the outside service provider optical fibre cables either directly (or via a splitter) with an optical fibre serving an individual dwelling unit. Recently, rather than splicing the optical fibres together, optical fibres may be provided with optical fibre connector ends or optical fibre adapters to enable optical fibre connections between the optical fibres feeding dwelling units and the outside service providers to be made, broken or reconfigured as appropriate.

As the number of outside service provider optical fibres increase (and given that these optical fibres may be split to enable the same outside service provider optical fibre to be coupled with more than one dwelling unit), the number of optical fibre connections to be managed increases dramatically.

Whilst various techniques exist for managing optical fibre connection complexity, they each have their own shortfalls which can make it difficult for an operative to manage and maintain optical fibre connections or, in extreme circumstances, can lead to fatigue or even failure.

Accordingly, if is desired to provide an improved optical fibre coupling device.

SUMMARY OF THE INVENTION

According to a first aspect of the present invention, there is provided an optical fibre coupling device, comprising: a first patch strip comprising a first plurality of optical fibre connectors arranged along a face of the first patch strip; and a second patch strip comprising a second plurality of optical fibre connectors arranged along a face of the second patch strip, the first and second patch strips being in a stacked arrangement where the second plurality of optical fibre connectors is offset from the first plurality of optical fibre connectors in a first and a second direction transverse to a stacking direction.

The first aspect recognises that one of the difficulties with existing optical fibre coupling devices is that they are typically required to fit into a relatively small space which provides for a relatively high density of optical fibre connectors. This leads to a difficulty in reliably identifying and accessing the appropriate optical fibre connectors since they are typically very closely co-located. The close proximities of these optical fibre connectors can cause physical challenges to the operative when making, breaking or reconfiguring connections using the optical fibre connectors.

Accordingly, there is provided a number of patch strips. The patch strips each have a number of optical fibre connectors (or adapters which receive and hold connectors). These optical fibre connectors or adapters may provide an entirely mechanical or both a mechanical and optical connection. The patch strips are stacked in a configuration in which optical fibre connectors from the different patch strips are offset from each other. This offset stacking occurs in two directions, these are the directions which are transverse to the direction of stacking. For example, if the patch strips are stacked generally along the 'Z' axis, then the patch strips are offset from each other along both the 'X' and the 'Y' axes. Such offsetting of the patch strips provides an arrangement where adjacent patch strips are stepped backwards, sideways and upwards which improves access to the individual optical fibre connectors when making, breaking or reconfiguring connections. This improved access assists an operative when managing or maintaining connections and helps to reduce the likelihood of fatigue or failure since adjacent optical fibre connections are undisturbed during this process and the optical fibre connections may be easily accessed without needing to move or manipulate adjacent patch strips.

In one embodiment, the first patch strip comprises an elongate strip and the first plurality optical fibre connectors is arranged in a longitudinal direction along the face of the first patch strip and the second patch strip comprises an elongate strip and the second plurality of optical fibre connectors is arranged in a longitudinal direction along the face of the second patch strip, the second patch strip being in the stacked arrangement adjacent the first patch strip to offset the second plurality optical fibre connectors in the first direction which is transverse to the longitudinal direction, rearward of the first plurality of optical fibre connectors and to offset the second plurality of optical fibre connectors in the second direction which is the longitudinal direction.

In one embodiment, the second patch strip is in the stacked arrangement adjacent the first patch strip to offset the second plurality of optical fibre connectors in the second direction and align the second plurality of optical fibre connectors with regions between optical fibre connectors of the first plurality of optical fibre connectors. Accordingly, adjacent patch strips are arranged so that the optical fibre connectors in those alternate strips are staggered to increase the space around individual optical fibre connectors. It will be appreciated that this further enhances the manual access to the individual optical fibre connectors so that patch connections can be made conveniently without needing to move the patch strips and with a reduced risk of disruption or damage to other optical fibre connectors. It will be appreciated that this is particularly useful when the optical fibre coupling device is provided in a relatively confined space. Furthermore, by offsetting optical fibre connectors from adjacent strips, the visibility of the optical fibre connectors is improved since they are unlikely to be obscured by any complimentary connector which engages with an optical fibre connector in an adjacent strip. Similarly, the visibility of any labels associated with those optical fibre connectors is improved.

In one embodiment, the face of the first and second patch strips are sloped. By sloping the face of the patch strips, the visibility of the optical fibre connectors is further improved, as is the visibility of any labels associated with the connectors. Also, by sloping the face of the patch strips, the optical fibre connectors themselves may be similarly sloped in order for optical fibre connections to more easily be made.

In one embodiment, the first and second plurality of optical fibre connectors are each operable to receive a fibre routed to an associated dwelling unit. Hence, each optical fibre connector may be associated with a fibre provided to a particular dwelling unit. This enables a patch connection to readily be made with the fibre of the desired dwelling unit.

In one embodiment, the first and second patch strips form part of respective first and second trays each operable to receive fibres routed to associated dwelling units. Accordingly, the patch strips may be provided as an integral part of optical fibre trays which receive the fibres provided to dwelling units. It will be appreciated that this provides for a convenient working space for when coupling the individual fibres with the individual optical fibre connectors associated with that tray.

In one embodiment, the first and second trays are pivotally connected with a support structure to enable the first and second trays to be pivoted from the stacked position.

By enabling the trays to pivot, trays may be moved from the stacked position to enable trays to be accessed for cleaning or maintenance activities.

In one embodiment, the coupling device comprises a securing arrangement operable to secure the first and second trays in the stacked position. Accordingly, the trays may be secured in the stacked position. Furthermore, securing may also involve using a tamper-proof seal which indicates when unauthorised access to the trays has occurred. It will be appreciated that only operatives with a comparatively degree of training would have the skills to reliably make and maintain optical fibre connections between the optical fibres and the optical fibre connectors, whereas a lesser trained operative may be routinely performing any patch connections. Accordingly, it is desirable to prevent or deter such lesser-trained operatives from manipulating optical fibres within the trays and to indicate when such manipulation has occurred.

In one embodiment, the first and second trays are provided with complimentary engaging structures operable to retain the first and second trays in the stacked position. Accordingly, the trays themselves may interconnect in order to improve the mechanical integrity and stability of the patch strips.

In one embodiment, the first and second plurality of optical fibre connectors are each operable to receive a complimentary optical fibre connector coupled with an optical fibre routed from a provider. Accordingly, complementary optical fibre connectors are provided on the patch strip and the optical fibres to enable the two to be coupled together. For example, the optical fibres may be provided with an optical fibre connector which engages with an adapter of the patch strip.

In one embodiment, each optical fibre connector is operable to mechanically retain an optical fibre.

In one embodiment, the optical fibre coupling device comprises a passive optical device operable to couple the optical fibre from a dwelling unit with the optical fibre routed from a provider, the coupled optical fibre being routed through the optical fibre connector to provide only mechanical retention. Hence, the two optical fibres may be spliced using the passive optical device and the patch strip connector only provides for mechanical restraint of the spliced optical fibres.

In one embodiment, the optical fibre coupling device comprises a parking strip having a third plurality of optical fibre connectors arranged along a face of the parking elongate strip, the parking strip being removably attachable to the second patch strip. Accordingly, a removable parking strip is provided which may be attached to the uppermost patch strip. Providing a parking strip enables any unpatched optical fibres to be safely retained within the optical fibre coupling device until patching is required. By providing the parking strip on the patch strip, the status of the optical fibre coupling device can easily be determined and the optical fibres to be patched can readily be located. By enabling the parking strip to be removed from the patch strip when a further patch strip is placed above the existing one, the compact nature of the coupling device is not compromised. Also, by enabling the parking strip to be attached to that new patch strip enables the existing parking strip to be reused.

In one embodiment, the optical fibre coupling device is provided within a multiple dwelling unit building distributor. It will be appreciated that the compact and easy access arrangement of the optical fibre coupling device is particularly suited to the restricted space constraints experienced by a typical multiple dwelling unit building distributor.

According to a second aspect of the present invention there is provided a method of arranging an optical fibre coupling device, comprising the steps of: stacking a first patch strip comprising a first plurality of optical fibre connectors arranged along a face of the first patch strip and a second patch strip comprising a second plurality of optical fibre connectors arranged along a face of the second patch strip in an arrangement where the second plurality of optical fibre connectors is offset from the first plurality of optical fibre connectors in a first and a second direction transverse to a stacking direction.

In embodiments, the method comprises method steps corresponding to features of the first aspect.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described, with reference to the accompanying drawings, in which.

DESCRIPTION OF THE EMBODIMENTS

Figure 1:
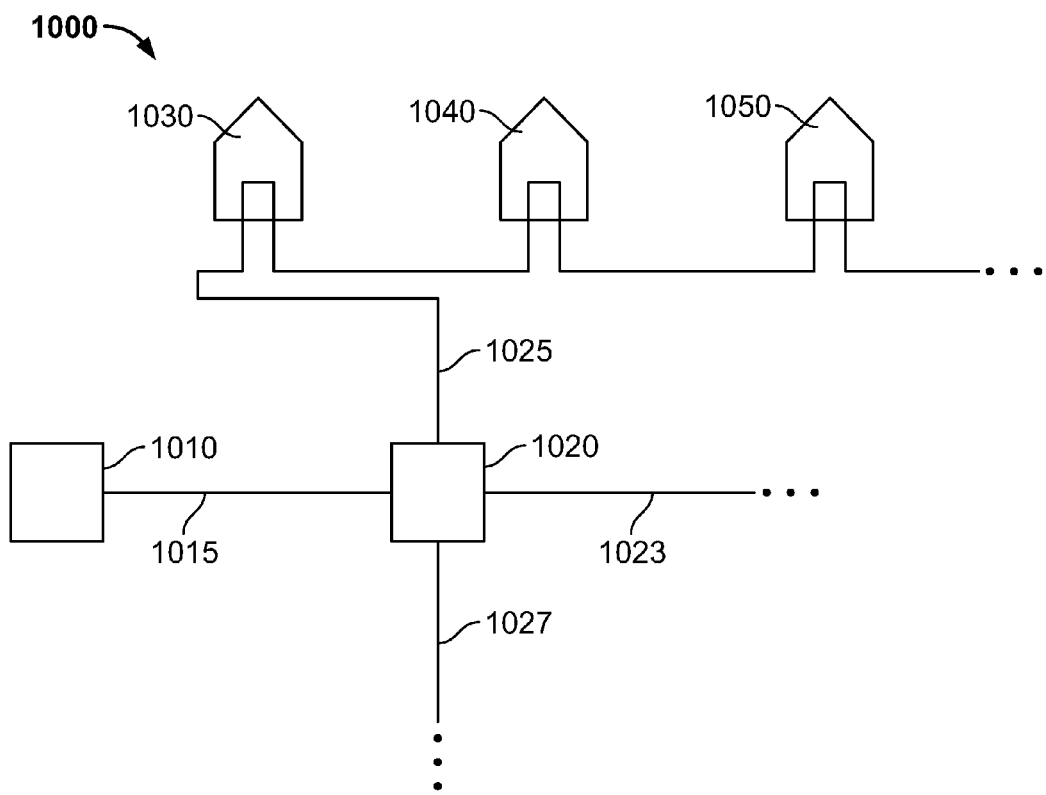
FIG. 1 illustrates a cable distribution arrangement.

FIG. 1 illustrates a cable distribution arrangement 1000. A central office 1010 associated with a service provider is coupled with a distribution point 1020 by an outside service provider optical fibre cable 1015. Distribution point 1020 may be coupled with further distributions points (not shown) using outside service provider distribution optical fibre cables 1023 and 1027. The distribution point 1020 couples with one or more multiple dwelling units 1030, 1040, 1050, using an outside service provider distribution optical fibre cable 1025. The outside service provider distribution optical fibre cable 1025 loops through each multiple dwelling unit 1030, 1040, 1050 in turn. The outside service provider distribution optical fibre cable 1025 may also loop through further multiple dwelling units (not shown). It will be appreciated that the multiple dwelling units may be residential, commercial or industrial buildings. In this way, it can be seen that the service provider couples via an optical network with the multiple dwelling units 1030, 1040, 1050. Details of how the outside service provider distribution optical fibre cable 1025 is then utilised within the multiple dwelling units 1030, 1040, 1050 are described below, with reference to FIG. 3.

Figure 2:
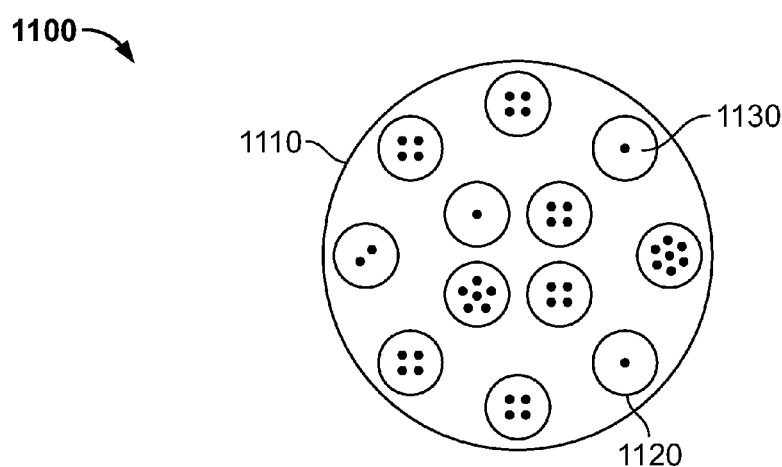
FIG. 2 illustrates an arrangement of an optical cable.

FIG. 2 illustrates a typical arrangement of an optical cable 1100, such as would be utilised for the outside service provider optical fibre cable 1015, the outside service provider distribution optical fibre cables 1023, 1025, 1027, or for optical fibre cables utilised within the multiple dwelling units 1030, 1040, 1050. The optical fibre cable 1100 comprises an outer jacket 1110 which provides for appropriate environmental protection of the optical fibre cable 1100. Disposed within the cable jacket 1110 are a plurality of tubes 1120. Within the tubes 1120 are provided one or more individual optical fibres 1130. Typically 16 or 32 individual optical fibres 1130 may be provided within a single tube 1120. Also a braided Kevlar (registered trade mark) strand (not shown) may be provided within optical fibre cable 1100 which may be mechanically coupled with a pulling tool to assist in routing the optical fibre cable.

Figure 3:
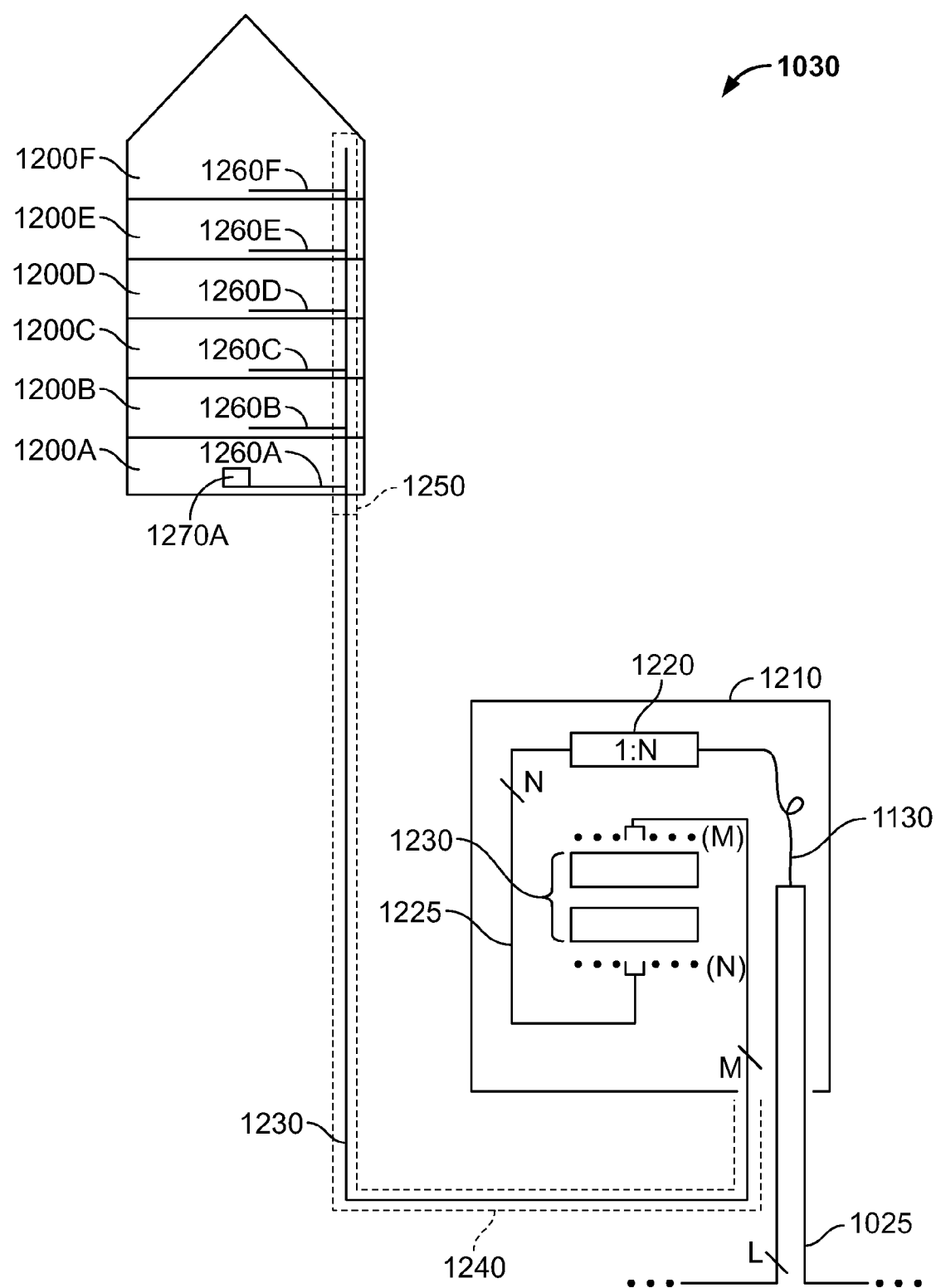
FIG. 3 illustrates an arrangement of a multiple dwelling unit building distributor according to an embodiment.

FIG. 3 illustrates an arrangement of a multiple dwelling unit building distributor 1210 for dwelling unit 1030 according to one embodiment. In the example shown in FIG. 3, the multiple dwelling unit 1030 comprises a single dwelling unit 1200A-1200F on each floor. However, it will be appreciated that more than one dwelling unit may be provided on each floor of the building. The other multiple dwelling units 1040, 1050 will generally have a similar general layout, although the number of floors and the number of dwelling units on each floor may vary from multiple dwelling unit to multiple dwelling unit.

The multiple dwelling unit building distributor 1210 receives the outside service provider distribution optical fibre cable 1025. One or more optical fibres 1130 from the outside service provider distribution optical fibre cable 1025 are pulled from the outside service provider distribution optical fibre cable 1025 and typically coupled with a splitter 1220. It will be appreciated that more than one splitter unit 1220 may be provided and that more than one optical fibre 1130 may be extracted from the outside service provider distribution optical fibre cable 1025, according to the needs of the multiple dwelling unit 1030. The splitter 1220 takes a single optical fibre 1130 and couples this optical fibre, typically using splicing techniques, with a plurality N of pigtail optical fibre 1225. The plurality of pigtail optical fibres 1225 are provided to a patching arrangement 1250 which enables the plurality of pigtail optical fibres 1225 to be selectively coupled with a riser optical fibre cable 1230 comprising a plurality M of optical fibres which leaves the multiple dwelling unit building distributor 1210.

The riser optical fibre cable 1230 is routed through a building region 1240 to a riser 1250. The building region 1240 may be, for example, a basement area of the multiple dwelling unit 1030. The riser cable 1230 may be surface mounted in the building region 1240.

The riser 1250 will typically be a service conduit within the multiple dwelling unit 1030 extending from the basement to the under-roof region of the building. The riser 1250 will therefore extend between the floors of the multiple dwelling unit 1030.

Within each dwelling unit 1200A-1200F, one or more optical fibres 1260A-1260F may be pulled from the riser cable 1230 in order to provide connectivity within the individual dwelling units 1200A-1200F. User equipment 1270A may then couple with the associated optical fibres 1260, as required.

It will be appreciated that arrangement enables user equipment within individual dwelling units to be coupled via the optical network with the service providers. Also, the presence of the patch arrangement 1230 within the multiple dwelling unit building distributor 1210 enables connectivity with different service providers to be achieved.

Figure 4:
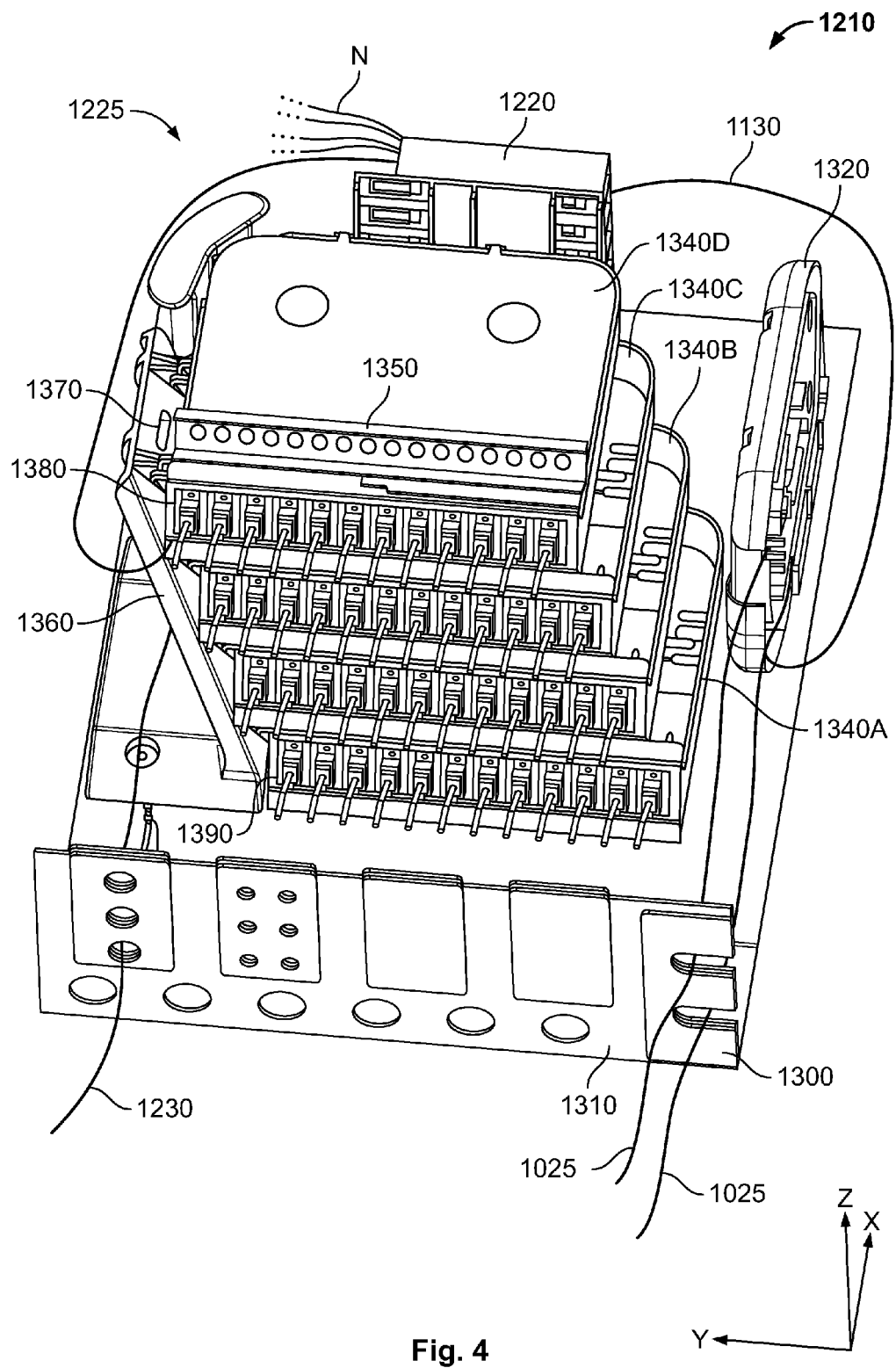
FIG. 4 is a perspective view of major components of the multiple dwelling unit building distributor of FIG. 3.

FIG. 4 illustrates a multiple dwelling unit distribution box 1210 according to one embodiment. The multiple dwelling unit distribution box 1210 receives the outside service provider distribution optical fibre cable 1025 via a blanking plug 1300. The blanking plug 1300 is removable from the front face 1320 of the multiple dwelling unit distribution box 1210 and a suitable blanking plug 1300 is insertable to match the size and arrangement of the outside service provider distribution optical fibre cable 1025. Hence, the cabling entering and leaving the multiple dwelling unit distribution box 1210 is routed through fixed and interchangeable blanking plugs. The fixed apertures may be utilised for commonly occurring cable arrangements, whereas the interchangeable blanking plugs (which are arranged to slidably de-couple from the front panel 1310) may be utilised to suit particular different optical fibre cable arrangements.

The outside service provider distribution optical fibre cable 1025 is provided to a loop tray 1320. The outside service provider distribution optical fibre cable 1025 performs a loop within the loop tray 1320 to improve optical performance. The loop tray 1320 is utilised as a basket for storage of all types of loops, for storage of shaved loose optical fibres and is provided with a zone for active fibres and a zone for dark fibres. Also, a splicing zone is provided. The individual optical fibres providing services to be utilised within the multiple dwelling unit 1030 are extracted and spliced within the loop tray 1320 to enable those optical fibres to be coupled with one or more splitters 1220.

The splitter 1220 receives an extracted optical fibre 1130 and couples that optical fibre with a plurality of pigtail optical fibres . The pigtail optical fibres 1225 each terminate at a connector plug 1390. As shown in FIG. 4, the pigtail optical fibres 1225 may then be inserted into the individual optical fibre connectors or optical fibre adapters provided on patch or connector strips 1380 forming part of individual stackable trays 1340A-1340D to make a mechanical and optical connection, as will be described in more detail below. It will be appreciated that although FIG. 4 shows pigtail optical fibres coupled with every individual optical fibre connector or optical fibre adapter provided on connector strips forming part of individual stackable trays 1340A-1340D, this will typically not be the case in most cases and that some connections will generally not be made. Also, although FIG. 4 shows pigtail optical fibres 1225 terminating at an optical fibre connector plug 1390, the pigtail optical fibres could instead splice with fibres within the trays 1340A-1340D, with the optical fibre connectors or optical fibre adapters in the connector strips 1380 providing only a mechanical connection. Also, the connector strips may be provided with adaptors which are installed ready for receiving and holding the connectors, into which adaptors the connectors will actually be installed at a later date.

The multiple dwelling unit distribution box 1210 also receives the riser optical fibre cable 1230 comprising a plurality of optical fibres routed through the multiple dwelling unit 1030. Each tray 1340A-1340D receives a plurality of optical fibres from the riser optical fibre cable 1230 and couples those individual optical fibres with optical fibre connectors or optical fibre adapters provided on the front face of a connector strip 1380 forming part of that tray.

For example, the connector tray 1340A may receive an individual optical fibre 1260A-1260F from each dwelling unit 1200A-1200F. Each of those individual optical fibres 1260A-1260F may be indicated within the associated dwelling unit 1200A-1200F as being associated with a television provider. Those individual optical fibres 1260A-1260F are routed to the tray 1340A and coupled with associated individual optical fibre connector or optical fibre adapter on the front face of that tray. For example, the left-most connector on tray 1340A may indicate dwelling unit 1200A, the adjacent connector may indicate dwelling unit 1200B, the adjacent connector may indicate dwelling unit 1200C, and so on. An optical fibre 1320 carrying television data may be extracted from the outside service provider distribution optical fibre cable 1025 within the loop tray 1320 and provided to the splitter 1220. The splitter 1220 will then couple the optical fibre 1320 with the plurality of pigtail optical fibres 1225. An operative will then be able to couple the individual pigtail optical fibres with the optical fibre connectors or optical fibre adapters within the tray 1340A for those dwelling units which have subscribed to this service. As further services are required, more trays may be added to the multiple dwelling unit distribution box 1210. Likewise, more splitters 1220 may be provided to distribute those services. It can be seen therefore that connectivity can be readily achieved between the customers in the dwelling units and the service provider.

In a point-to-point network configuration, the individual optical fibres from the outside service provider distribution optical fibre cable 1025 may be provided directly to the trays 1340A to 1340D without the need of the loop tray 1320 or the splitter 1220. Instead, the individual optical fibres are provided to the associated tray 1340A to 1340D and terminated at the optical fibre adapter or optical fibre connector provided on each connector strip 1380. The individual optical fibres from the riser cable 1230 may then couple with the appropriate optical fibre connectors or optical fibre adapters provided on the trays to provide the required connectivity.

It will be appreciated that as the number of services and customer uptake grows, the number of connections or patches that need to be made increases considerably. Also it is likely that the number of reconfigurations required as a result of changes in customer demand will increase. Hence, it is desirable for any patching to be as straightforward as possible.

Accordingly, as can be see in FIG. 4, the arrangement of the connector strips 1380 on the trays 1340A-1340D is intended to facilitate this patching process. The trays 1340A-1340D are stacked on top of each other in the direction Z. The trays are also offset rearwardly in the direction X and to the side in the direction Y in order to provide better access to the optical fibre connectors or optical fibre adapters in the connector strips 1380. For example, tray 1340B is arranged such that its connector strip is adjacent but stepped back in the direction X from the connector strip of the underlying tray 1340A. In addition, the connector strip for the tray 1340B is offset in the direction Y from that of the connector strip for tray 1340A. In this example, this offset causes the optical fibre connectors or optical fibre adapters to be offset from each other such that an optical fibre connector on the tray 1340B is aligned between two optical fibre connectors on the tray 1340A. This further helps to provide increased space around the optical fibre connector to enable provide for easier manipulation. Likewise, offsetting in this way enables any labels associated with individual optical fibre connectors to be less likely to be obscured by an inserted pigtail optical fibres. Also, the optical fibre connectors or optical fibre adapters are positioned at an angle set be the sloping face of the connector strips 1380 to further facilitate access, as best shown in FIG. 5.

To further improve usability, a removable parking strip 1350 is provided which is removably attached adjacent to the connector strip of uppermost tray 1340D. As further trays are added, this parking strip 1350 is removed to enable that subsequent tray to engage with the tray beneath it and the parking strip is then re-attached to that new uppermost tray. The parking strip 1350 is utilised to receive any pigtail optical fibres 1225 which are not connected with a optical fibre connector or optical fibre adapter in the connector strips. This enables the operative to easily find the pigtail optical fibres associated with a particular service when a patch connection is to be made. Also, it helps to maintain an uncluttered cabling arrangement, thereby preventing any inadvertent snagging or tangling of the fibres which helps to reduce levels of fatigue and failure.

Figure 5:
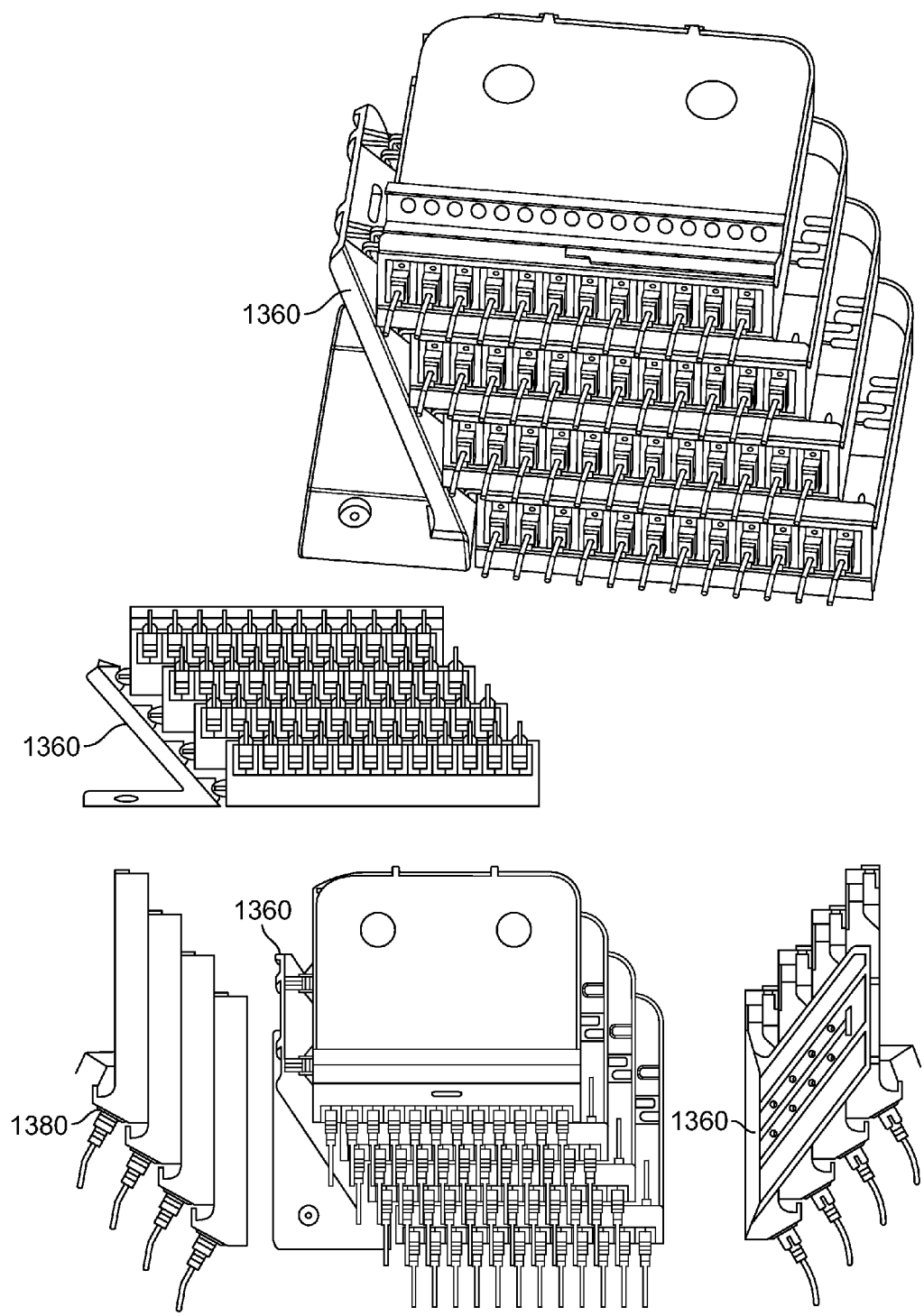
FIG. 5 shows various views of trays of the multiple dwelling unit building distributor when in a secured position.
Figure 6:
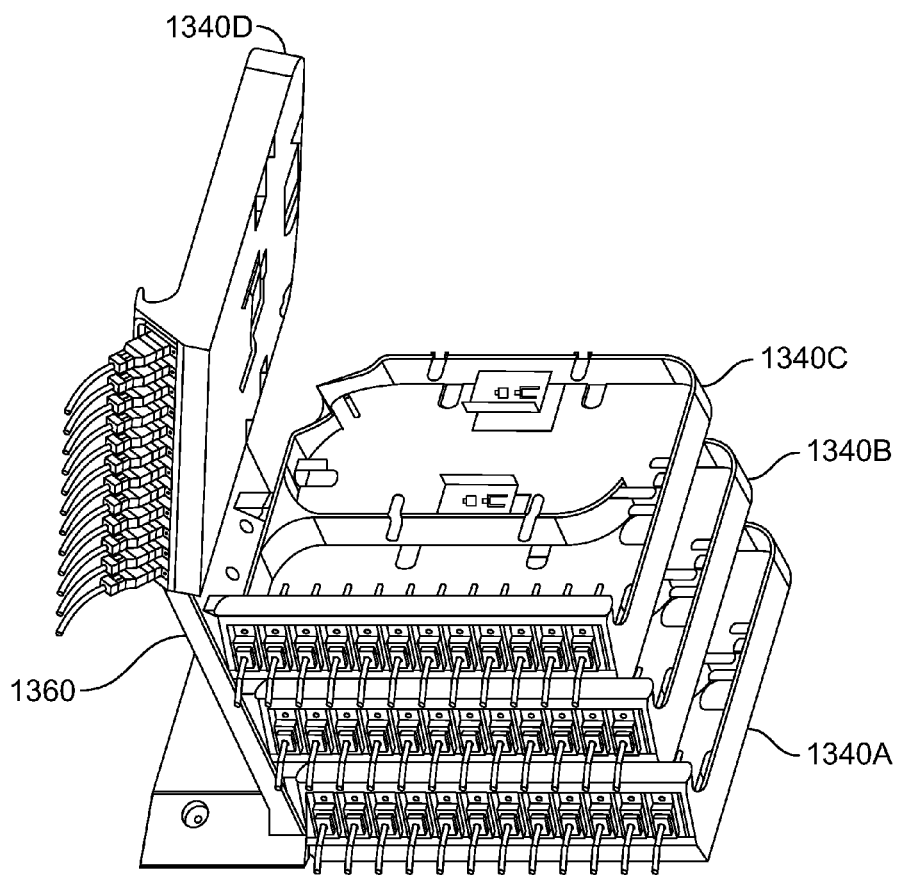
FIG. 6 shows various views of trays of the multiple dwelling unit building distributor when in a pivoted position.
Figure 6:
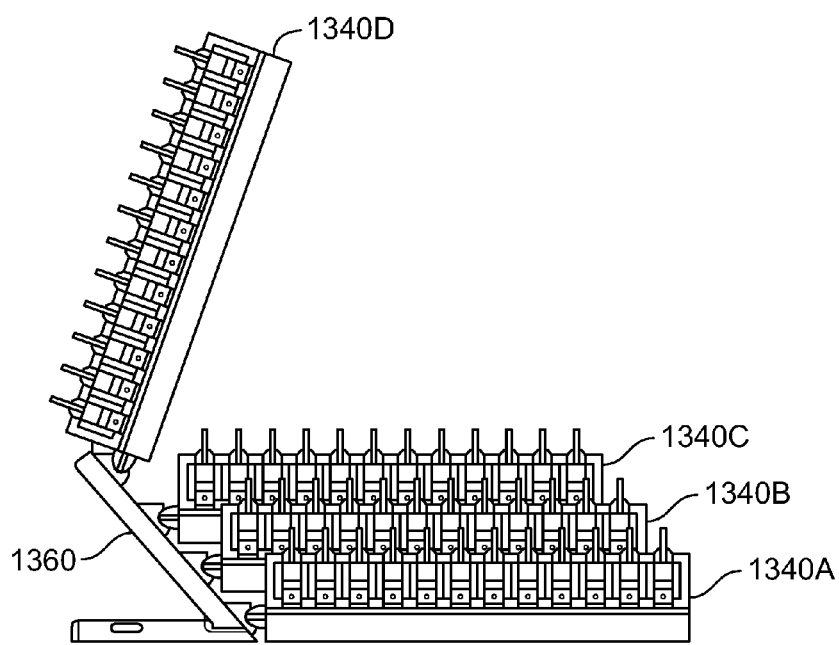

In order to further facilitate maintenance of the multiple dwelling unit distribution box 1210, the trays 1340A-1340D are pivotally engageable with a support structure 1360 as shown in more detail in FIGS. 5 and 6. By enabling trays 1340A-1340D to pivot, access can be provided to the optical fibres within those trays. This enables those optical fibres to be maintained and the trays to be cleaned, as required.

In order to prevent unauthorised access to the optical fibres within the trays, a securing strap (not shown) may be provided which attaches to an aperture 1370 provided within the pivoting support structure 1360 and wraps around the trays 1340A-1340D. The securing strap may then be crimped with a tamper-proof seal to prevent unauthorised access to the tray from being undetected.

As can seen in FIG. 5, the trays are shaped to inter-engage with each other when stacked, this helps to provide a robust structure able to withstand optical fibre connector or adaptor manipulation.

Accordingly, it can been seen that the trays are staggered in two directions transversally to the stacking access so that the optical fibre connectors or optical fibre adapters carried by each tray are interspaced with the optical fibre connectors or optical fibre adapters of adjacent trays in the stack. This stepping backwards and upwards, as well as sideways to show each row of optical fibre connectors or optical fibre adapters improves manual access to those individual optical fibre connectors or optical fibre adapters when making patch connections. The row of optical fibre connectors or optical fibre adaptors are thus presented to the operative as a back-sloping panel with optical fibre connectors or optical fibre adapters in alternate rows, staggered to increase the space around those optical fibre connectors. The optical fibre connections can therefore be made conveniently without needing to separate the trays. This is particularly useful in the confined space of a multiple dwelling unit distribution box 1210.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. An optical fibre coupling device, comprising:
   a first patch strip comprising a first plurality of optical fibre connectors arranged along a face of said first patch strip; and
   a second patch strip comprising a second plurality of optical fibre connectors arranged along a face of said second patch strip, said first and second patch strips being in a stacked arrangement where said second plurality of optical fibre connectors is offset from said first plurality of optical fibre connectors in a first and a second direction transverse to a stacking direction.

2. The optical fibre coupling device as claimed in claim 1, wherein said first patch strip comprises an elongate strip and said first plurality optical fibre connectors is arranged in a longitudinal direction along said face of said first patch strip and said second patch strip comprises an elongate strip and said second plurality of optical fibre connectors is arranged in a longitudinal direction along said face of said second patch strip, said second patch strip being in said stacked arrangement adjacent said first patch strip to offset said second plurality optical fibre connectors in said first direction which is transverse to said longitudinal direction, rearward of said first plurality of optical fibre connectors and to offset said second plurality of optical fibre connectors in said second direction which is said longitudinal direction.

3. The optical fibre coupling device as claimed in claim 1, wherein said second patch strip is in said stacked arrangement adjacent said first patch strip to offset said second plurality of optical fibre connectors in said second direction and align said second plurality of optical fibre connectors with regions between optical fibre connectors of said first plurality of optical fibre connectors.

4. The optical fibre coupling device as claimed in claim 1, wherein said face of said first and second patch strips are sloped.

5. The optical fibre coupling device as claimed in claim 1, wherein said first and second plurality of optical fibre connectors are each operable to receive an optical fibre routed to an associated dwelling unit.

6. The optical fibre coupling device as claimed in claim 5, wherein said first and second patch strips form part of respective first and second trays each operable to receive optical fibres routed to associated dwelling units.

7. The optical fibre coupling device as claimed in claim 6, wherein said first and second trays are pivotally connected with a support structure to enable said first and second trays to be pivoted from said stacked position.

8. The optical fibre coupling device as claimed in claim 6, comprising:
a securing arrangement operable to secure said first and second trays in said stacked position.

9. The optical fibre coupling device as claimed in claim 6, wherein said first and second trays are provided with complimentary engaging structures operable to retain said first and second trays in said stacked position.

10. The optical fibre coupling device as claimed in claim 1, wherein said first and second plurality of optical fibre connectors are each operable to receive a complimentary optical fibre connector coupled with an optical fibre routed from a provider.

11. The optical fibre coupling device as claimed in claim 10, wherein
said first and second plurality of optical fibre connectors are each operable to receive an optical fibre routed to an associated dwelling unit,
said first and second patch strips form part of respective first and second trays each operable to receive optical fibres routed to associated dwelling units, wherein said first and second trays are pivotally connected with a support structure to enable said first and second trays to be pivoted from said stacked position, and
wherein each optical fibre connector is operable to mechanically retain an optical fibre.

12. The optical fibre coupling device as claimed in claim 11, comprising a passive optical device operable to couple the optical fibre to a dwelling unit with the optical fibre routed from a provider, the coupled optical fibre being routed through the optical fibre connector to provide only mechanical retention.

13. The optical fibre coupling device as claimed in claim 1, comprising:
a parking strip having a third plurality of optical fibre connectors arranged along a face of said parking elongate strip, said parking strip being removably attachable to said second patch strip.

14. The optical fibre coupling device as claimed in claim 1, said optical fibre coupling device being provided within a multiple dwelling unit building distributor.

15. A method of arranging an optical fibre coupling device, comprising the steps of:
stacking a first patch strip comprising a first plurality of optical fibre connectors arranged along a face of said first patch strip and a second patch strip comprising a second plurality of optical fibre connectors arranged along a face of said second patch strip in an arrangement where said second plurality of optical fibre connectors is offset from said first plurality of optical fibre connectors in a first and a second direction.

* * * * *